(12) United States Patent
Hofmann et al.

(10) Patent No.: US 9,062,711 B2
(45) Date of Patent: Jun. 23, 2015

(54) BEARING ASSEMBLY

(71) Applicant: Aktiebolaget SKF, Göteborg (SE)

(72) Inventors: Katrin Hofmann, Atzhausen (DE);
Armin Olschewski, Schweinfurt (DE);
Arno Stubenrauch, Aidhausen (DE);
Malinipriya Thangavelu, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/311,478

(22) Filed: Jun. 23, 2014

(65) Prior Publication Data

US 2015/0055906 A1 Feb. 26, 2015

(30) Foreign Application Priority Data

Jun. 21, 2013 (DE) .......................... 10 2013 211 762

(51) Int. Cl.
| | |
|---|---|
| *F16C 33/58* | (2006.01) |
| *F16C 19/54* | (2006.01) |
| *F16C 19/36* | (2006.01) |
| *F16C 33/62* | (2006.01) |

(52) U.S. Cl.
CPC ............. *F16C 19/542* (2013.01); *F16C 19/364* (2013.01); *F16C 33/62* (2013.01)

(58) Field of Classification Search
CPC ..... F16C 19/383; F16C 19/385; F16C 33/605
USPC ................................................ 384/551, 571
See application file for complete search history.

(56) References Cited

U.S. PATENT DOCUMENTS

| | | | |
|---|---|---|---|
| 3,943,803 A | 3/1976 | Hafla | |
| 5,017,025 A * | 5/1991 | Williams | ...................... 384/584 |

(Continued)

FOREIGN PATENT DOCUMENTS

| | | |
|---|---|---|
| DE | 2410540 A1 | 9/1975 |
| DE | 3727151 A1 | 2/1989 |

(Continued)

OTHER PUBLICATIONS

Gaberson H.A, "Rotating machinery energy loss due to misalignment," Energy Conversion Engineering Conference, Aug. 11, 1996, 1809-1812, vol. 3, Proceedings of the 31st Intersociety Washington, DC, USA.

(Continued)

*Primary Examiner* — Phillip A Johnson
(74) *Attorney, Agent, or Firm* — Bryan Peckjian; SKF USA Inc. Patent Dept.

(57) ABSTRACT

A bearing assembly includes first and second rolling-element bearings each having an inner ring that is connectable to a shaft for rotation therewith, each inner ring having a running surface (raceway) for rolling elements and an intermediate ring disposed axially between the inner ring of the first rolling-element bearing and the inner ring of the second rolling-element bearing. The intermediate ring has a maximum outer diameter smaller than a maximum diameter of the running surface of the inner ring of the first rolling-element bearing and smaller than a maximum diameter of the running surface of the inner ring of the second rolling-element bearing. The intermediate ring has an axial dimension that is smaller than a radial dimension of a cross-section of the intermediate ring, and that is smaller than 0.5 mm.

10 Claims, 5 Drawing Sheets

(56) References Cited

U.S. PATENT DOCUMENTS

| | | | |
|---|---|---|---|
| 5,067,827 A | 11/1991 | Bokel | |
| 7,918,608 B2* | 4/2011 | Braun | 384/504 |
| 2006/0204156 A1* | 9/2006 | Takehara et al. | 384/544 |
| 2008/0124014 A1 | 5/2008 | Smook et al. | |
| 2014/0004992 A1 | 1/2014 | Weist | |

FOREIGN PATENT DOCUMENTS

| | | |
|---|---|---|
| DE | 102012012900 A1 | 1/2014 |
| EP | 1837535 A | 9/2007 |
| EP | 1837535 A1 | 9/2007 |
| WO | 2011045146 A | 4/2011 |
| WO | 2011045146 A1 | 4/2011 |

OTHER PUBLICATIONS

Veale K.L. et al, "Efficiency management within an industrial environment," Industrial Engineering and Engineering Management (IE&EM), Sep. 3, 2011, 1859-1863, 2011 IEEE 18th International Conference on, IEEE.

* cited by examiner

BEARING ASSEMBLY

CROSS-REFERENCE

This application claims priority to German patent application no. 10 2013 211 762.0 filed on Jun. 21, 2013, the contents of which are fully incorporated herein by reference.

TECHNOLOGICAL FIELD

Exemplary embodiments relate to the field of supporting or bearing rotating shafts and in particular to a bearing assembly.

BACKGROUND

Figure 3A:
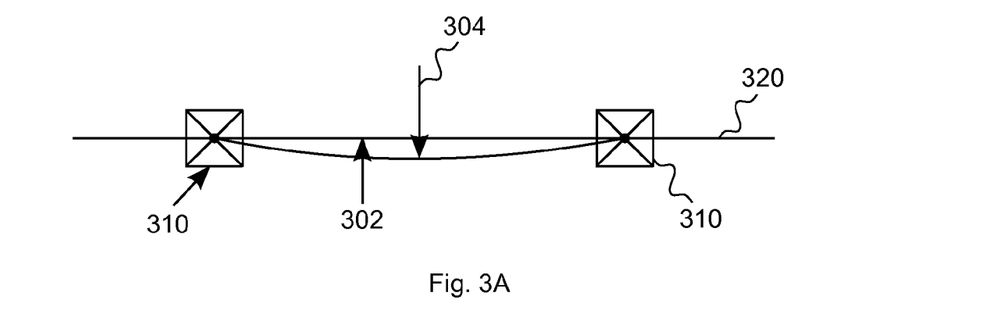
FIGS. 3a to 3c are schematic illustrations of shaft states when the shafts are loaded.
Figure 3B:
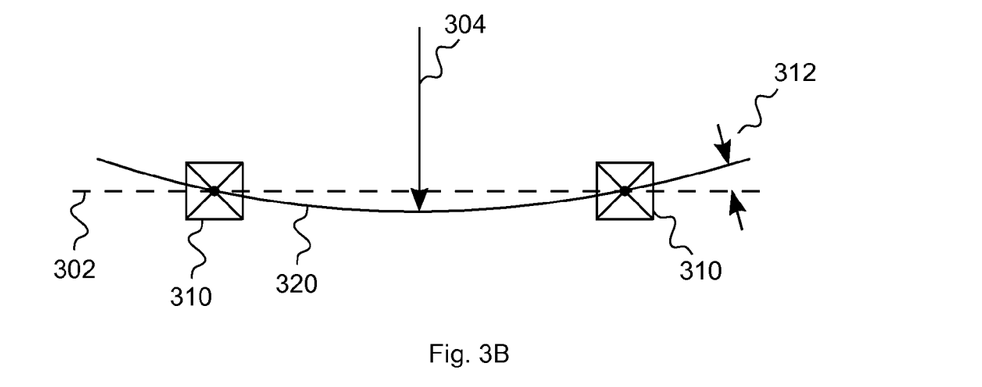
Figure 3C:
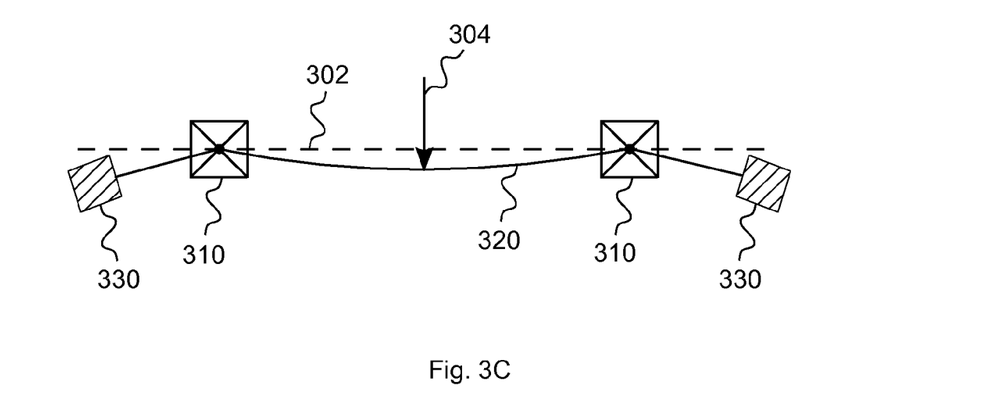

It is known to support rotating shafts with bearing assemblies at the ends of the shafts, and the shafts may be subject to a load between the bearings. These loads can deform the shaft and thereby also cause deformations inside the bearing assemblies. FIG. 3a shows an example of a central (or centered) load 304 on a shaft 320 which shaft 320 is supported by two bearing assemblies 310. The central load 304 bends the shaft 320 away from an unloaded state 302 of the shaft 320. The central load of the shaft 320 (which may be evenly centered or off-center) results in a loading of the shaft 320 and of the shaft pins and a bending dynamic as shown in FIG. 3b. In this way an angle 312 forms at the ends of the shaft between the actual axis of rotation of the shaft and the unloaded axis of rotation of the shaft. Alternatively, due to the presence of rotating masses 330 at the ends of the shaft 320 outboard of the bearing assemblies 310, the bending dynamic of the shaft 320 can produce another form of shaft-pin bending dynamic at the ends of the shaft.

These shaft deformations can produce deformations inside the bearing assemblies. Such deformations can in turn result in increased bearing wear, and consequently lead to a shorter bearing service life.

SUMMARY

It would therefore be desirable to provide a bearing assembly which makes possible a reduction of wear and/or an increase of the bearing service life.

Some exemplary embodiments relate to a bearing assembly which includes a first rolling-element bearing, a second rolling-element bearing, and an intermediate ring. The first rolling-element bearing comprises an inner ring which is connectable to a shaft for rotation therewith. The inner ring of the first rolling-element bearing has a running surface (raceway) for rolling elements of the first rolling-element bearing. The second rolling-element bearing comprises an inner ring which is also connectable to the shaft for rotation therewith. The inner ring of the second rolling-element bearing has a running surface (raceway) for rolling elements of the second rolling-element bearing. The intermediate ring is disposed in the axial direction between the inner ring of the first rolling-element bearing and the inner ring of the second rolling-element bearing. The intermediate ring further has a maximum outer diameter which is smaller than a maximum diameter of the running surface of the inner ring of the first rolling-element bearing and smaller than a maximum diameter of the running surface of the inner ring of the second rolling-element bearing.

Arranging an intermediate ring between the inner rings of the rolling-element bearing helps prevent the inner rings from deforming towards the rolling elements and helps prevent a deformation of the contact geometry in the roller/flange rolling contact. Deformation of the contact geometry is disadvantageous in that it may cause more rapid wear of the bearing flanges and/or the rolling elements and potentially prevent the required service life of the bearing from being achieved. A spacing between the guide flanges of the inner rings is created by the intermediate ring so that during deformation of the bearing assembly the guide flanges of the inner rings do not press against each other, or at least press against each other with a reduced force. In this way wear can be kept low, and the bearing service life can be increased.

In some exemplary embodiments the intermediate ring has an axial dimension which is smaller than a radial dimension of a cross-section of the intermediate ring. This keeps the additional axial installation space required by the intermediate ring low.

Some exemplary embodiments relate to a bearing assembly in which the two rolling-element bearings are tapered roller bearings in an X-arrangement. This allows such a bearing assembly having a long service life to be implemented economically.

BRIEF DESCRIPTION OF THE DRAWINGS

Exemplary embodiments are explained in more detail below with reference to the accompanying Figures.

DETAILED DESCRIPTION

In the following discussion, the same reference numbers may sometimes be used with various described exemplary embodiments for objects and functional units which have the same or similar functional properties. Furthermore, summarizing reference numbers may be used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, for example their dimensions, as long as the description does not explicitly or implicitly indicate otherwise. Furthermore, optional features of the different exemplary embodiments can be combinable or interchangeable with one another.

Figure 4:
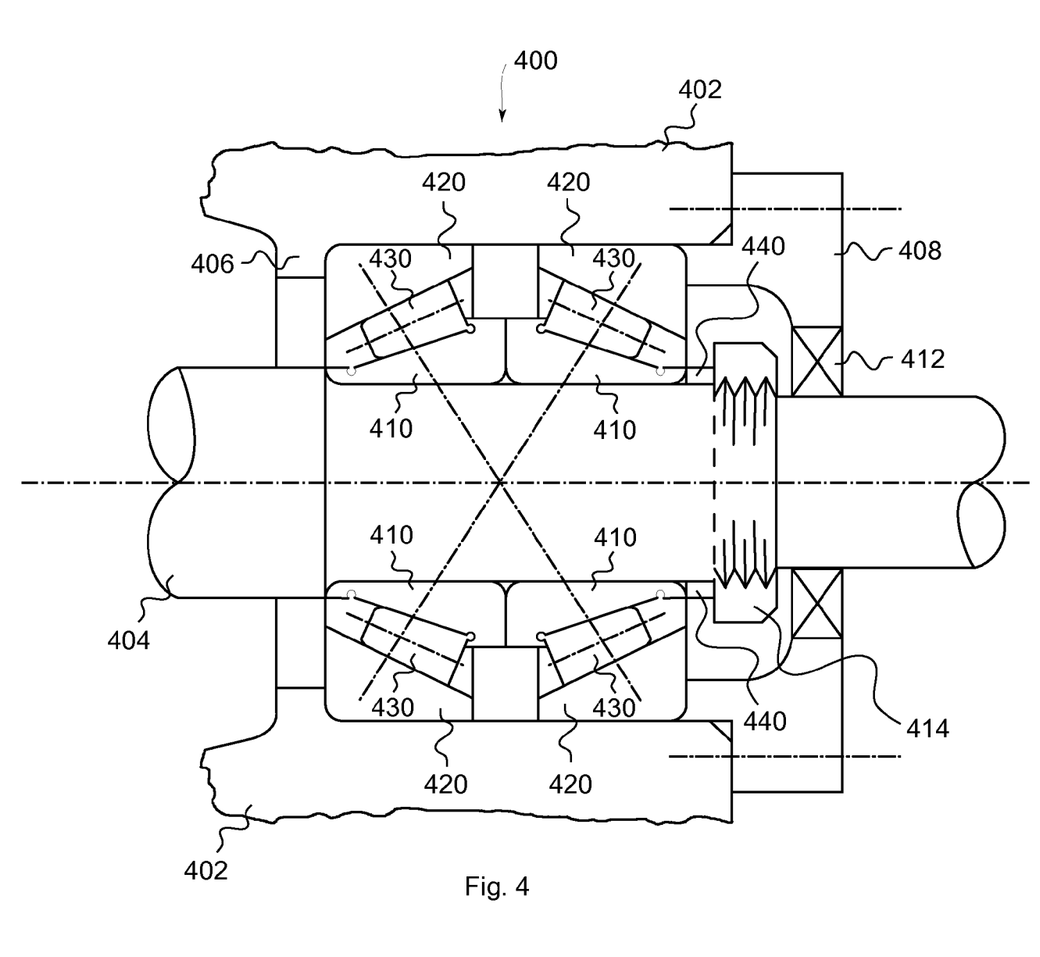
FIG. 4 is a schematic illustration of a tapered roller bearing in an X-arrangement.

A wear-increasing deformation of the guide flanges of the rolling-element bearing inner rings can occur in bearing assemblies that include at least two rolling-element bearings. An example of a bearing assembly 400 including two tapered roller bearings is shown in FIG. 4. The tapered roller bearings include inner rings 410 which abut each other axially, and outer rings (bearing outer rings) 420 connected to a housing 402. The bearings further include conical rolling-elements 430 (rollers). In this case the tapered roller bearings are arranged on a shaft 404 in an X-arrangement with respect to each other. The inner rings of the tapered roller bearings are disposed between an axial stop of the shaft 404 and a spacer disk 440 for preloading the bearings. The outer rings 420 of the tapered roller bearings are disposed between an attachment flange of the bearing (the housing) 406 and an outer-ring attachment 408. A seal 412 can be disposed between the outer-ring attachment 408 and the shaft 404. A preload can be applied to the bearing via the spacer disk 440 using a screw 414. For this purpose the shaft 404 can have a thread in the region of the screw 414.

Figure 5:
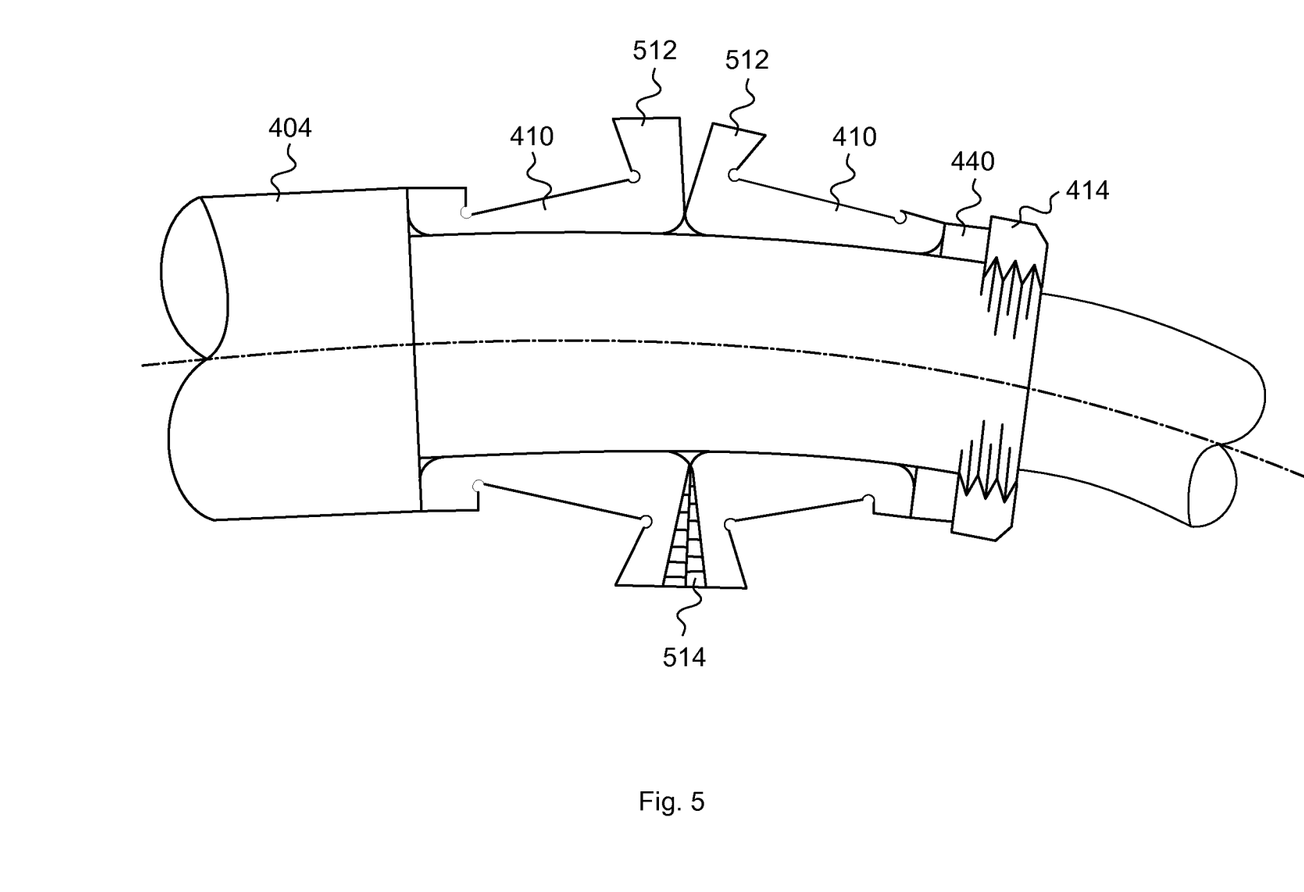
FIG. 5 shows a schematic illustration of a deformation of a bearing arrangement without an intermediate ring.

When the shaft 404 bends, a gap or gap formation (or formation of an opening) can occur on one side of the shaft 404 between the inner rings 410 and/or between the guide flanges 512 of the inner rings 410, and on the opposite side of the shaft 404 the guide flanges 512 can exert a mutual pressure 514 on each other which may deform the guide flanges 512. When deformed, the guide flanges 512 can exert an increased pressure on the rolling elements of the bearing assembly and thus cause increased wear and a reduction of the bearing service life. For example, friction corrosion can result.

Due to the mutual pressure (illustrated by lining 514) at the interface of the guide flanges 512, a plastic deformation, for example, of the flange can also result, which can lead to a disruption in the operation (wear) of the bearing.

Figure 1:
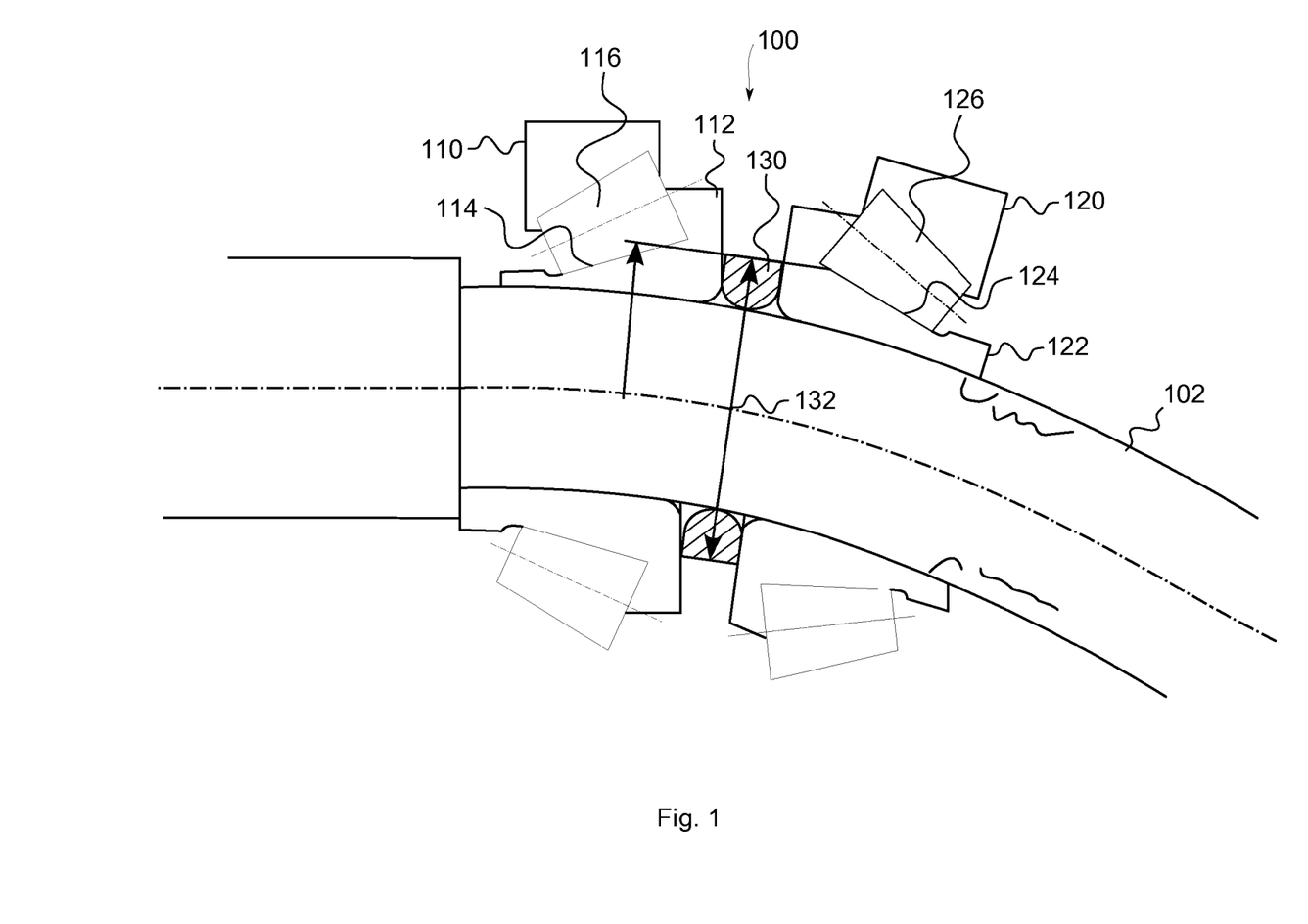
FIG. 1 is a schematic illustration of a bearing assembly.

FIG. 1 shows a schematic illustration of a bearing assembly 100 according to an exemplary embodiment. The bearing assembly 100 includes a first rolling-element bearing 110, a second rolling-element bearing 120, and an intermediate ring 130. The first rolling-element bearing 110 comprises an inner ring 112 which is connected to a shaft 102 for rotation therewith. The inner ring 112 of the first rolling-element bearing 110 has a running surface (raceway) 114 for rolling elements 116 of the first rolling-element bearing 110. The second rolling-element bearing 120 includes an inner ring 122 which is also connectable to the shaft 102 for rotation therewith. The inner ring 122 of the second rolling-element bearing 120 has a running surface (raceway) 124 for rolling elements 126 of the second rolling-element bearing 120. The intermediate ring 130 is disposed axially between the inner ring 112 of the first rolling-element bearing 110 and the inner ring 122 of the second rolling-element bearing 120. The intermediate ring 130 further has a maximum outer diameter 132 which is smaller than a maximum diameter of the running surface 114 of the inner ring 112 of the first rolling-element bearing 110 and smaller than a maximum diameter of the running surface 124 of the inner ring 122 of the second rolling-element bearing 120.

Due to the arrangement of the intermediate ring 130 between the inner rings 112, 122 of the rolling-element bearing 110, a gap can be maintained between the guide flanges of the inner rings. This gap substantially prevents the inner rings 112, 122 from pressing against each other when the shaft 102 deforms, or at least reduces a contact pressure between the inner rings when the shaft 102 deforms. The inner rings 112, 122 are thus not deformed in a manner that causes them to press against the rolling elements, or at most, the inner rings 112, 122 press against each other significantly less, and thus deform significantly less and press significantly less against the rolling elements. In this way wear can be significantly reduced and bearing service life significantly increased.

The bearing assembly 100 can include two (the first and the second) rolling-element bearings or more than two rolling-element bearings. When more than two rolling-element bearings are present, an intermediate ring 130 can be arranged only between the first and the second rolling-element bearings, or correspondingly also between all or some further inner rings of the rolling element bearings.

The first rolling-element bearing 110 and the second rolling-element bearing 120 include, for example, in addition to the inner ring and the rolling elements, at least one outer ring, and can be of the same or different bearing types (e.g. ball bearings, tapered roller bearings, angular contact ball bearings, cylindrical roller bearings, or spherical roller bearings). For example, the first rolling-element bearing 110 and the second rolling-element bearing 120 can be tapered roller bearings. In this case, the first rolling-element bearing 110 and the second rolling-element bearing 120 can be arranged, for example, in an X-arrangement (e.g., defined by axes of rotation of the rolling elements which intersect on the axial side facing away from the respective other rolling-element bearing) or an O-arrangement (e.g., defined by axes of rotation of the rolling elements which intersect on the side facing the respective other rolling-element bearing).

If the first rolling-element bearing and the second rolling-element bearing are of the same bearing type, the two rolling-element bearings can be embodied differently (e.g. due to asymmetric load or difference in available installation space) or also constructed symmetric to each other in the axial direction. In this way, for example, costs can be held low, since a larger number of identical rolling-element bearings can be implemented.

The inner rings of the rolling-element bearings can, for example, have a guide flange (e.g. also called a "bearing flange" or generally a "flange"), at least on an axial side, protruding radially over or beyond the running surface. Each of the two inner rings further has a running surface (raceway) which the rolling elements of the bearing run or roll along during operation.

Depending on the bearing type, the running surfaces of the bearing rings can, for example, extend parallel to the axis of rotation of the shaft 102 (e.g. in a cylindrical roller bearing), a section of the surface of a torus (e.g. in ball bearings) or can be tilted at a fixed angle with respect to the axis of rotation of the shaft 102 (e.g. in tapered roller bearings). A maximum diameter of the running surface of an inner ring can accordingly be constant along the running surface in the axial direction (e.g., in a cylindrical roller bearing) or vary in the axial direction (e.g., in a ball bearing or in a tapered roller bearing). The maximum diameter then corresponds to that diameter which is largest in the axial direction along the running surface.

The axial direction extends, for example, parallel to the axis of rotation of the (un-deformed) shaft 102 and the radial direction extends, e.g., orthogonal to the axis of rotation of the shaft 102.

The shaft 102 can be any component, which in operation rotates about its axis, of a machine or device in which a bearing assembly 100 according to the described concept is used. The shaft 102 can be connected via the inner rings of the rolling-element bearing for rotation therewith (e.g. no relative rotation between the shaft and the inner rings without destruction or damage) and is, for example, not part of the bearing assembly 100. Alternatively the shaft 102 could be part of the bearing assembly 100.

The intermediate ring 130 (also called an "intermediate disk" or a "tolerance disk") is disposed in the axial direction between the inner rings of the rolling-element bearing. In this case the intermediate ring 130 can, for example, directly abut in the axial direction on the inner ring 112 of the first rolling-element bearing 110 and on the inner ring 122 of the second rolling-element bearing 120 (e.g. without another component between the bearing rings and the intermediate ring, but disregarding connecting means, such as, e.g., adhesive). In this way the bearing assembly 100 can be implemented using little additional axial installation space. The bearing ring 130 can be connected to one or both bearing rings for rotation therewith or may be disposed loosely between the two inner rings. Alternatively one or more components can also be disposed axially between the intermediate ring 130 and one or both inner rings of the rolling-element bearing.

An outer diameter 132 of the intermediate ring 130 is smaller than a maximum diameter of the running surfaces of the rolling-element bearing. In this way it can be ensured, for example, that a gap between the guide flanges, which extend radially out over or beyond the running surfaces and provide a guiding for the rolling elements, is generated, into which each guide flange can enter/be displaced during deformation without pressing against the other guide flange. If the intermediate ring 130 were to be larger than the maximum diameter of the running surfaces of the inner ring of the rolling-element bearing, this effect would, for example, at least be weakened since the one guide flange would be pushed against the other guide flange via the intermediate ring 130. In other words, the intermediate ring 130 extends, for example, at most up to the (radial) inner edge of the flange. The maximum outer diameter 132 of the intermediate ring 130 corresponds in this case, for example, to the diameter of a radially-outer surface of the intermediate ring 130, which ends the intermediate ring 130 radially outward or is the farthest radially-outward-lying point of the intermediate ring 130.

For example, the outer diameter 132 of the intermediate ring 130 can be smaller than a diameter of the running surface at a point or a part of the running surface which is closest to the intermediate ring 130.

The intermediate ring 130 can have a substantially rectangular or square cross section or a quadrangular cross section having rounded corners (rounded transitions between the sides). In this way the intermediate ring 130 can have a (e.g., constant, average, or maximum) axial dimension (e.g. axial extension, thickness, or axial length) which is smaller than a radial dimension of a cross-section of the intermediate ring 130 (e.g. distance between inner diameter and outer diameter of the intermediate ring). In this way the intermediate ring 130 needs only a small amount of axial installation space. The exact dimensions of the intermediate ring 130 can differ depending on the area of application of the bearing assembly, since the size of the rolling-element bearings can vary in wide ranges. For some applications, the intermediate ring 130 can, for example, have an axial dimension of less than 0.5 mm (or less than 0.3 mm, less than 0.2 mm, or less than 0.1 mm), or the axial dimension can fall between 0.5 and 0.05 mm (or between 0.2 mm and 0.1 mm).

The intermediate ring 130 can include different materials or be comprised of different materials. For example, the intermediate ring 130 can include steel or plastic with glass fibers, or be comprised of steel or plastic with glass fibers.

Figure 2:
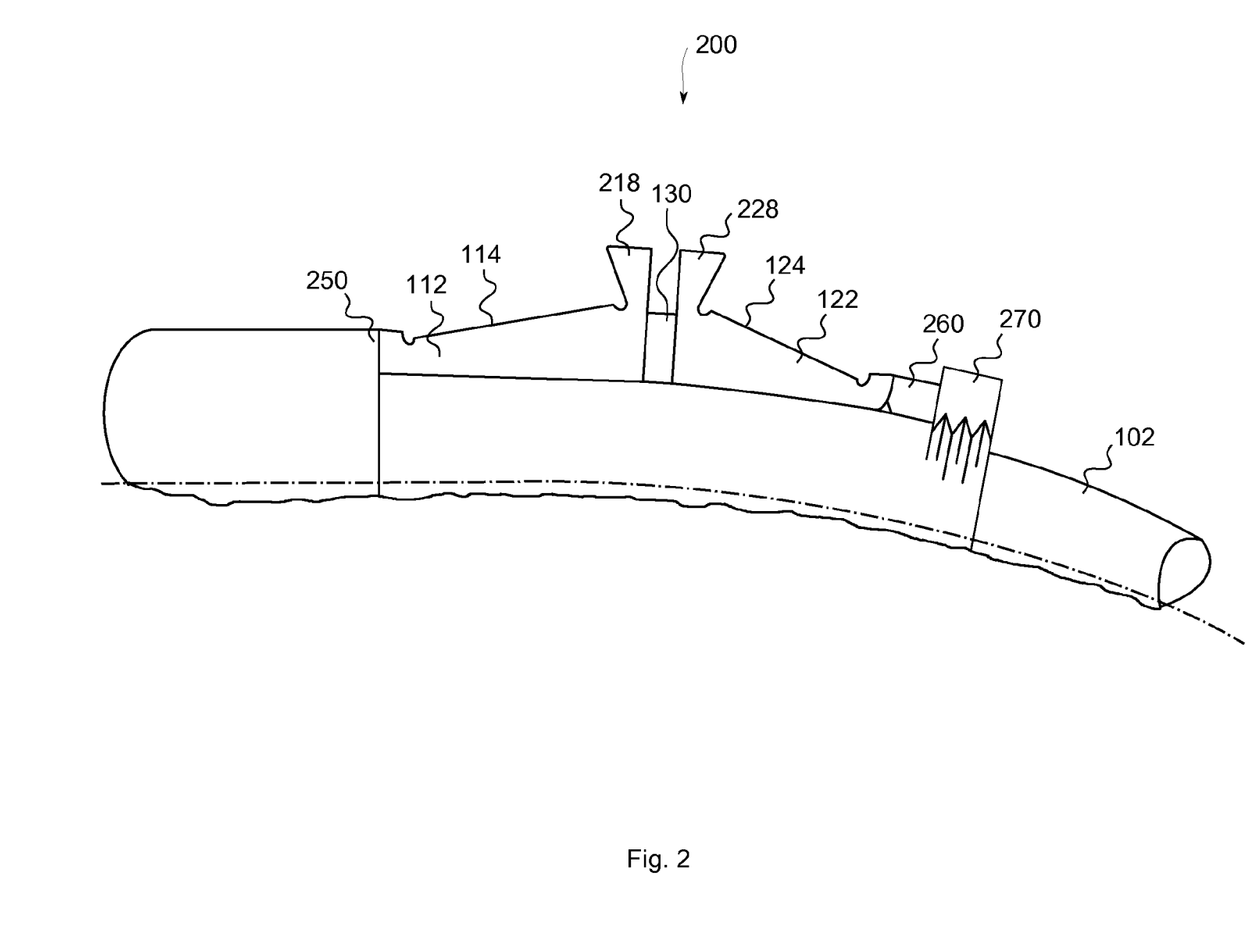
FIG. 2 is a schematic illustration of a further bearing assembly.

FIG. 2 shows a schematic illustration of a further bearing assembly 200 according to an exemplary embodiment. The bearing assembly 200 substantially corresponds to the structure of the bearing assembly from FIG. 1, so that accordingly the descriptions of the previous embodiments apply to this embodiment as well. The bearing assembly 200 is disposed on a shaft 102 having an axial stop 250. The bearing assembly 200 is pressed against the axial stop 250 on an end opposite the axial stop by a screw or nut 270 via a spacer disk 260, and thus fixed in position. An intermediate ring 130 is disposed between the inner rings of the two rolling-element bearings of the bearing assembly 200 so that there is an axial gap between the guide flange 218 of the inner ring 112 of the first rolling-element bearing and the guide flange 228 of the inner ring 122 of the second rolling-element bearing, which axial gap provides space for a deforming of the guide flange during deforming of the shaft 102.

Some exemplary embodiments relate to a tapered roller bearing assembly in an X-arrangement including at least one intermediate disk. In this case an intermediate disk can be introduced between two tapered roller bearings in an X-arrangement (the intermediate disk comprising, e.g. steel plate, plastic with glass fibers), which intermediate disk prevents the adjacent flanges of the bearing from pressing against each other during bending of the shaft on which the inner rings sit. In other words, due to the presence of the intermediate ring 130, contact, for example, between the guide flanges during deformation of the shaft can be prevented, and this can increase the bearing service life. The concept described can, for example, be used in wind turbines.

In a bearing assembly as shown in FIG. 4, an intermediate ring may be integrated between the inner rings of the two tapered roller bearings in order to obtain a bearing assembly according to the concept described.

Some exemplary embodiments relate to a wind turbine including a bearing assembly according to the concept described or one of the above-described exemplary embodiments.

Some exemplary embodiments relate to a method for manufacturing a bearing assembly including a first rolling-element bearing, a second rolling-element bearing, and an intermediate ring according to the above-described concept or one of the exemplary embodiments.

The features disclosed in the foregoing description, in the claims that follow, and in the drawings can be relevant individually, as well as in any combination, to the realization of the invention in its various embodiments.

Although some aspects of the present invention have been described in the context of a device, it is to be understood that these aspects also represent a description of a corresponding method, so that a block or a component of a device is also understood as a corresponding method step or as a characteristic of a method step. In an analogous manner, aspects which have been described in the context of or as a method step also represent a description of a corresponding block or detail or feature of a corresponding device.

The above-described exemplary embodiments represent only an illustration of the principles of the present invention. It is understood that modifications and variations of the arrangements and details described herein will be clear to other persons of skill in the art. It is therefore intended that the invention be limited only by the scope of the following patent claims, and not by the specific details which have been presented with reference to the description and the explanation of the exemplary embodiments.

REFERENCE NUMBER LIST

100 Bearing assembly
102 Shaft
110 First rolling-element bearing
112 Inner ring of the first rolling-element bearing
114 Running surface of the inner ring of the first rolling-element bearing
116 Rolling elements of the first rolling-element bearing
120 Second rolling-element bearing
122 Inner ring of the second rolling-element bearing
124 Running surface of the inner ring of the second rolling-element bearing
126 Rolling elements of the second rolling-element bearing
130 Intermediate ring
132 Maximum outer diameter of the intermediate ring
200 Bearing assembly
250 Axial stop
260 Spacer disk 270 Screw
302 Unloaded state of the shaft
304 Central loading of the shaft
310 Bearing assembly
310 Angle at the ends of the shaft
320 Shaft
330 Rotating mass
400 Bearing assembly
402 Housing
404 Shaft
406 Attachment flange of the bearing
408 Outer-ring attachment
410 Inner ring
412 Seal
414 Screw
420 Outer ring
430 Rolling elements
440 Spacer disk
512 Guide flange
514 Pressure

We claim:

1. A bearing assembly comprising:
a first rolling-element bearing including an inner ring connectable to a shaft for rotation therewith, wherein the inner ring of the first rolling-element bearing has a running surface for rolling elements of the first rolling-element bearing;
a second rolling-element bearing including an inner ring connected to the shaft for rotation therewith, wherein the inner ring of the second rolling-element bearing has a running surface for rolling elements of the second rolling-element bearing; and
an intermediate ring disposed axially between the inner ring of the first rolling-element bearing and the inner ring of the second rolling-element bearing, wherein the intermediate ring has a maximum outer diameter smaller than a maximum diameter of the running surface of the inner ring of the first rolling-element bearing and smaller than a maximum diameter of the running surface of the inner ring of the second rolling-element bearing, and
wherein the intermediate ring has an axial dimension which is smaller than a radial dimension of a cross-section of the intermediate ring, and smaller than 0.5 mm.

2. The bearing assembly according to claim 1, wherein the intermediate ring includes steel or plastic with glass fibers or is comprised of steel or plastic with glass fibers.

3. The bearing assembly according to claim 1, wherein the intermediate ring abuts in the axial direction directly on the inner ring of the first rolling-element bearing and on the inner ring of the second rolling-element bearing.

4. The bearing assembly according to claim 1, wherein the first rolling-element bearing and the second rolling-element bearing are of the same bearing type.

5. The bearing assembly according to claim 1, wherein the first rolling-element bearing and the second rolling-element bearing are tapered roller bearings.

6. The bearing assembly according to claim 5, wherein the first rolling-element bearing and the second rolling-element bearing are disposed in an X-arrangement.

7. The bearing assembly according to claim 1, wherein the first rolling-element bearing and the second rolling-element bearing are symmetric to each other in the axial direction.

8. A wind turbine including the bearing assembly according to claim 1.

9. The bearing assembly according to claim 1,
wherein the intermediate ring includes steel or plastic with glass fibers or is comprised of steel or plastic with glass fibers, and
wherein the intermediate ring abuts in the axial direction directly on the inner ring of the first rolling-element bearing and on the inner ring of the second rolling-element bearing, and
wherein the first rolling-element bearing and the second rolling-element bearing are tapered roller bearings disposed in an X-arrangement.

10. A bearing assembly comprising:
a first rolling-element bearing including an inner ring connectable to a shaft for rotation therewith, the inner ring of the first rolling-element bearing having a first raceway;
a second rolling-element bearing including an inner ring connected to the shaft for rotation therewith, the inner ring of the second rolling-element bearing having a second raceway; and
an intermediate ring disposed axially between the inner ring of the first rolling-element bearing and the inner ring of the second rolling-element bearing, the intermediate ring having an outer diameter smaller than a maximum diameter of the first raceway of the inner ring of the first rolling-element bearing and smaller than a maximum diameter of the second raceway of the inner ring of the second rolling-element bearing and the intermediate ring having an inner diameter, and
wherein an axial thickness of the intermediate ring is less than a radial distance between the inner diameter and the outer diameter of the intermediate ring and is less than 0.5 mm.

* * * * *